(12) United States Patent
Myers

(10) Patent No.: US 7,185,409 B1
(45) Date of Patent: Mar. 6, 2007

(54) INSTALLATION TOOL FOR IRRIGATION EMITTER BARBS WITH CUTTER

(76) Inventor: Michael Myers, 2950 Traverse Creek La., Las Vegas, NV (US) 89135

( * ) Notice: Subject to any disclaimer, the term of this patent is extended or adjusted under 35 U.S.C. 154(b) by 266 days.

(21) Appl. No.: 11/060,201

(22) Filed: Feb. 17, 2005

(51) Int. Cl.
B23P 19/02 (2006.01)

(52) U.S. Cl. .......................... 29/268; 29/267; 29/270; 30/92; 269/6

(58) Field of Classification Search ............... 29/268, 29/267, 270, 278, 242; 260/6, 3; 30/92
See application file for complete search history.

(56) References Cited

U.S. PATENT DOCUMENTS

| | | |
|---|---|---|
| 1,464,807 A | 8/1923 | Clark |
| 3,698,419 A | 10/1972 | Tura |
| 4,222,985 A | 9/1980 | Greenleaf |
| 4,336,652 A | 6/1982 | Robertson |
| 4,392,616 A | 7/1983 | Olson |
| 4,497,321 A | 2/1985 | Fearing et al. |
| 4,522,339 A | 6/1985 | Costa |
| 5,177,846 A | 1/1993 | Bryant |
| 5,398,718 A | 3/1995 | Roinick, Sr. |
| 5,722,142 A | 3/1998 | Myers |
| 5,893,201 A * | 4/1999 | Myers .................. 29/268 |
| 5,991,997 A * | 11/1999 | Schley et al. ............ 29/426.5 |
| 6,370,780 B1 | 4/2002 | Robertson et al. |
| 6,581,262 B1 * | 6/2003 | Myers .................. 29/268 |
| 2006/0254057 A1 * | 11/2006 | Houseman et al. ............ 30/92 |

* cited by examiner

Primary Examiner—Lee D. Wilson
(74) Attorney, Agent, or Firm—Frank J. McGue

(57) ABSTRACT

A tool installs barb emitters in irrigation tubing. The tool has a cradle which receives irrigation tubing and a punch mounted opposite the cradle. The punch has a first cylinder and a second cylinder telescopically received within the first cylinder. The first cylinder has a cap at the upper end and an annular ring extending inwardly from to partially occlude the lower end. The second cylinder includes a second cap at the upper end which slidably engages the first cylinder and is resiliently urged by a spring against the annular ring. The cap has a punch holder extending downwardly therefrom. A needle has a sharp tip extending downwardly from the punch holder through the second cap to a point within the second cylinder when the spring is fully extended and beyond the second cylinder when the spring is fully compressed. One of the jaws has a knife blade extending from the other end thereof opposite. The of the jaws defines a semi-circular concave anvil at the other end. The anvil has an axially extending slot therein which receives the cutting edge of said knife blade when the handles are closed together.

1 Claim, 2 Drawing Sheets

INSTALLATION TOOL FOR IRRIGATION EMITTER BARBS WITH CUTTER

TECHNICAL FIELD

This invention relates to the field of irrigation tools, and, more particularly, to a tool for installing irrigation emitter barbs in irrigation tubing in combination with a cutter.

BACKGROUND OF THE INVENTION

It is common to use plastic tubing to distribute water to various locations for irrigation purposes. In such use, hollow irrigation emitter barbs are mounted as desired on the plastic tubing. Such barbs are hollow allowing the water contained within the tubing to be distributed, or emitted, as desired. Small diameter flexible tubing can be mounted on the barbs to place the water where desired.

Irrigation emitter barbs are generally symmetrical and are provided with sharp piercing points at both ends to penetrate the wall of the tubing. Further, enlarged heads are provided to impede the withdrawal of the barb from the tubing. While irrigation emitter barbs can be installed by hand, the sharp piercing points can cause injury to workers. In fact, the present invention was inspired after applicant viewed the bloodied hands of workers installing a large number of such irrigation emitter barbs.

Various types of installation tools are well known in art. For example, punch tools have been employed which punch the hole in the tubing for the subsequent placement of irrigation emitter barbs. However, installation still requires handling of the sharp piercing points by the installer.

U.S. Pat. No. 4,222,985 entitled LABORATORY TOOL which issued on Sep. 16, 1980 to Greenleaf discloses a ferrule removal tool which utilizes a solid post and slot combination which engages the end, not the periphery, of a tube to remove a ferrule therefrom.

U.S. Pat. No. 4,497,321 entitled EAR TAG APPLICATORS which issued on Feb. 5, 1985 to Fearing et al. shows the use of a tapered pin to engage the interior recess of a hard conical spike portion of a two piece animal tag. The spike rests upon a platform of the device.

U.S. Pat. No. 4,522,339 entitled IRRIGATION FITTING WITH INSTALLATION BARB AND ASSOCIATED INSTALLATION BARB TOOL which issued on Jun. 11, 1985 to Costa discloses an irrigation fitting barb and associated barb insertion tool. However, the Costa tool requires use of the specific Costa fitting to properly function and thus does not function with standard irrigation emitter barbs.

U.S. Pat. No. 5,177,846 entitled INSERTION TOOL which issued on Jan. 12, 1983 to Bryant discloses a hand held tool for inserting fittings or flow control devices into an irrigation line.

U.S. Pat. No. 4,392,616 entitled SELF-PERFORATING DRIP IRRIGATION DEVICE which issued on Jul. 12, 1983 to Olson shows, in FIGS. 10 and 11, a tool for inserting barbs into an irrigation line.

U.S. Pat. No. 1,464,807 entitled DENTAL INSTRUMENT which issued on Aug. 14, 1923 to Clark shows a plier type tool having a punch at the far end and an anvil portion which cooperates with a recess.

U.S. Pat. No. 3,698,419 entitled DEVICES FOR PIERCING TUBES IN CLOSED PRESSURE SYSTEMS which issued on Oct. 17, 1972 to Tura and U.S. Pat. No. 5,398,718 entitled TAP LINE PLIERS which issued on Mar. 21, 1995 to Roinick Sr. are representative of several patents showing plier type tools having a lower jaw which supports a tube and an upper jaw which has a punch.

U.S. Pat. Nos. 5,722,142 and 5,893,201 both entitled INSTALLATION TOOL FOR IRRIGATION EMITTER BARBS which issued on Mar. 3, 1998 and Apr. 13, 1999, respectively, to the present inventor provide a tool for using the irrigation emitter barbs themselves as a punch.

U.S. Pat. No. 6,581,262 entitled INSTALLATION TOOL FOR IRRIGATION EMITTER BARBS which issued on Jun. 24, 2003 to the present inventor provides a tool which utilizes a spring loaded punch and cradle to create the holes for insertion of the irrigation emitter barbs. This invention has proven satisfactory for insertion of irrigation emitter barbs but users have indicated a need for a tool which provides a more satisfactory means for trimming and cutting irrigation tubing.

U.S. Pat. No. 4,336,652 entitled CUTTING TOOL FOR FLEXIBLE PLASTIC ONDUIT which issued on Jun. 29, 1982 to Robertson provides a cutting tool useful in cutting, inter alia, irrigation tubing. It does not provide a mechanism for inserting irrigation barbs into said tubing.

The present invention meets this need.

None of the known prior art disclose the combination set forth herein.

SUMMARY OF THE INVENTION

It is an object of this invention to provide a tool for installing irrigation emitter barbs in irrigation tubing.

It is a further object of this invention to provide a tool for installing irrigation emitter barbs in irrigation tubing and for trimming irrigation tubing as needed.

It is still another object of this invention to provide a tool for safely installing irrigation emitter barbs in irrigation tubing.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
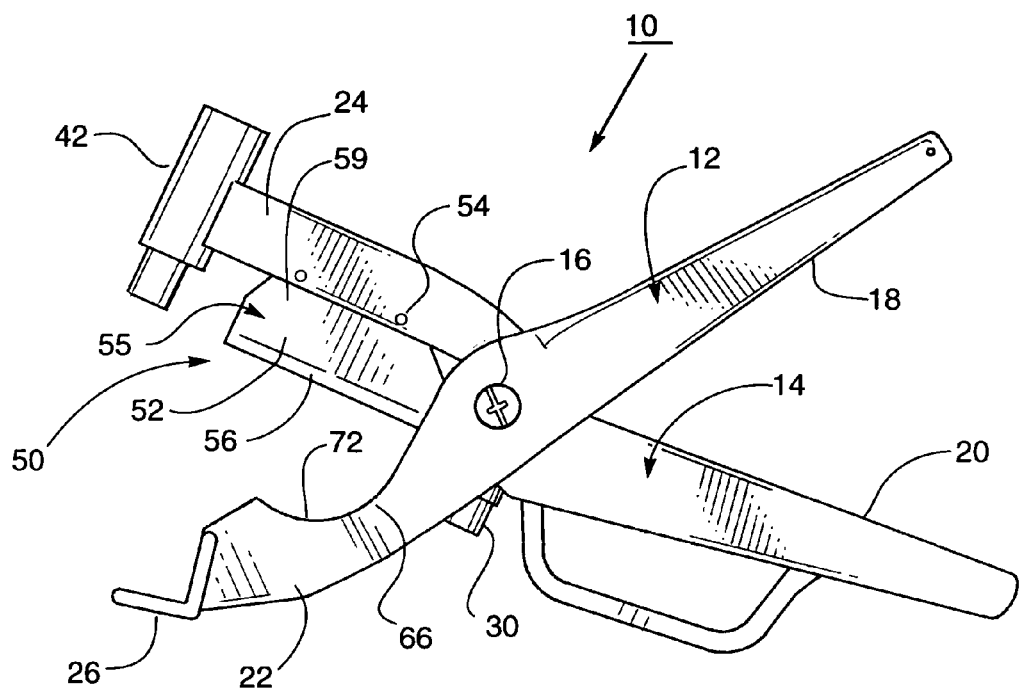
FIG. 1 is a perspective view of one side of one embodiment of the present invention.
Figure 2:
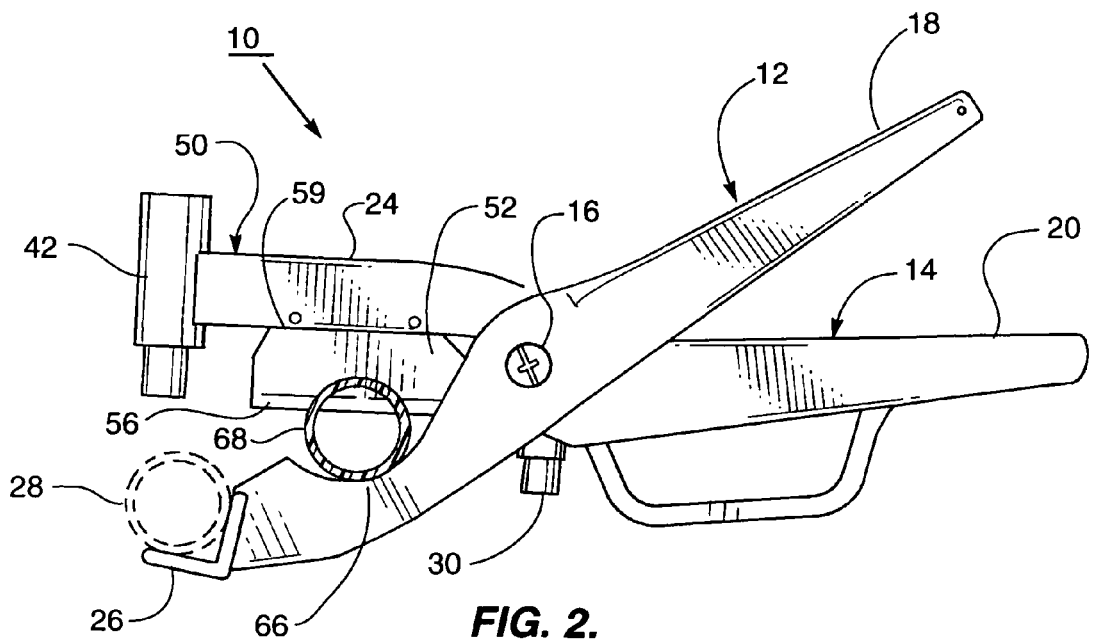
FIG. 2 is a partial cross sectional view of the embodiment of FIG. 1 in operation cutting a section of irrigation tubing.
Figure 4:
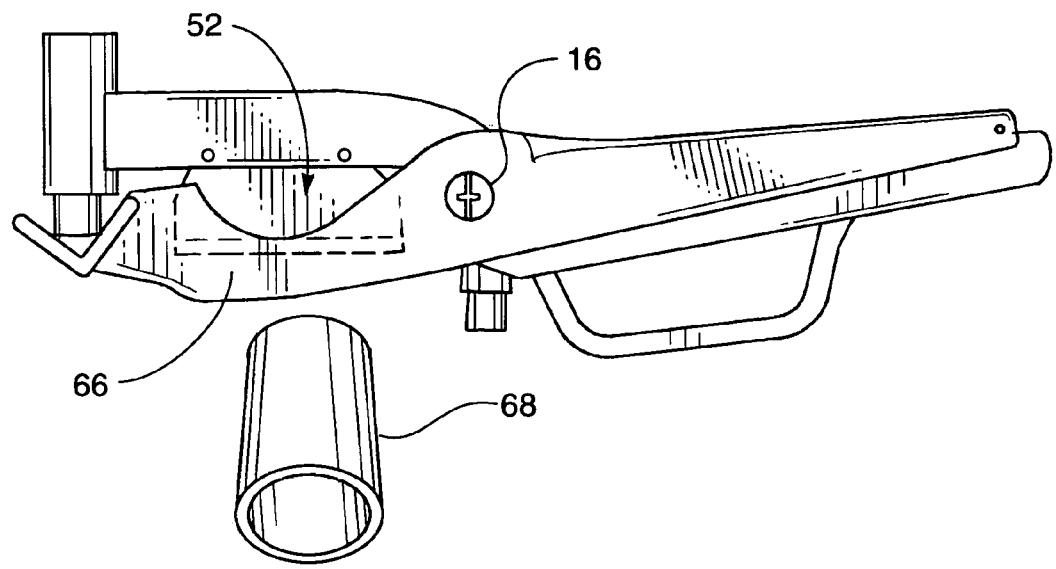
FIG. 4 is a partial cross sectional view of the embodiment of FIGS. 1 and 2 after completely cutting a section of irrigation tubing.
Figure 3:
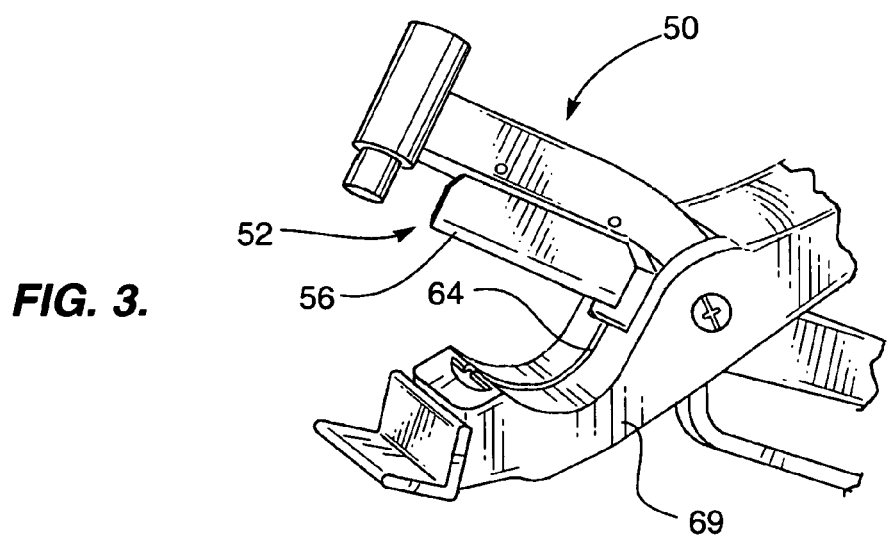
FIG. 3 is a perspective close up of the cutting tool of the present invention.

Referring more particularly to the drawings by characters of reference, FIGS. 1–3 disclose one embodiment of an irrigation tool 10. Irrigation tool 10 comprises a cradle member 12 and a punch member 14. Cradle member 12 and punch member 14 are arranged in crossed relation and pivotally connected intermediate their ends at pivot 16. The portions of cradle member 12 and barb holder member 14 extending rearwardly from pivot 16 constitute cradle handle 18 and punch handle 20, respectively. The portions of cradle member 12 and punch member 14 extending forwardly from pivot 16 constitute cradle jaw 22 and punch jaw 24, respectively.

It will be understood by those skilled in the art that other plier type arrangements would be applicable to the present invention. For example, a double pivot vice grip plier arrangement would also be suitable for use in the present invention.

Mounted at end of cradle jaw 22 is a cradle 26 which is an upwardly opening V-shape and elongated widthwise for receiving a peripheral portion of irrigation tubing 28. A punch 42 is mounted at the distal end of punch jaw 24. Mounted on punch handle 20 proximate to pivot 16 is an inserter 30. The structure and operation of punch 42, cradle 26 and inserter 30 are fully described in U.S. Pat. No. 6,581,262 entitled INSTALLATION TOOL FOR IRRIGATION EMITTER BARBS which issued on Jun. 24, 2003 to Michael Myers, the present inventor, and is herein incorporated by reference.

The present invention is an improvement on the prior tool by the addition of a cutting tool or shears 50 finding particular, but not necessarily exclusive utility for cutting flexible plastic pipe or conduit such as conventional polyvinyl or polyethylene conduit for water lines. The tool is adapted for cutting a variety of diameters of pipe, ranging generally from one-half inch, to one and one-quarter inch ID pipe. The tool 50, as shown in the drawings, comprises a longitudinally extending knife blade 52 having a sharpened edge 56 positioned on punch jaw 24 intermediate between punch 42 and pivot 16. At its heel 59 the blade is inserted into a knife blade slot 55 and mounted to punch jaw 24 via screws or roll pins 53 inserted into holes 54. When assembled, knife blade 52 is axially aligned with punch member 14 with a downwardly directed sharp cutting edge 56. Knife blade 52 is readily replaceable removing the screws or roll pins 53 and pulling. Old knife blade 52 is removed and a new knife blade 52 inserted therein. Screws or roll pins 53 are replaced and tool 50 is ready for operation.

Cooperatively associating with the knife blade 52, to form cutting tool 50, the cradle jaw 22 includes an anvil 66 adapted to receive and support a conduit or pipe 68 to be cut. The anvil 66 is formed of a generally channel-shaped configuration by spaced apart side walls 69. The anvil 66 is a generally semi-circular concave wall member formed in cradle jaw 22 intermediate between cradle 26 and pivot 16 thereby defining a semi-circular seat 72 for supporting the conduit or pipe to be cut. To permit knife blade 52 to pass completely through conduit 68 to be cut, a knife receiving slot 64 is provided defined by side walls 69 opposite blade 52. In this closed configuration, knife blade 52 is completely sheathed within the slot 64. Further, with this construction, the knife blade can pass completely through a conduit to be cut, and into the anvil or cradle slot 64, thereby insuring complete severance.

In use, conduit 68 to be cut is placed in anvil 66 with the cutting line aligned beneath the knife blade 52. The tool 10 is squeezed in pliers fashion to bring knife blade 52 to bear on the conduit 68 supported in anvil 66. In this manner, conduit 68 is severed quickly, cleanly and easily by squeezing the handles 18 and 20 together. A smooth, clean, sharp cut is provided which does not damage the cut ends of conduit 68, leaving them cleanly cut at right angles and suitable for the insertion of appropriate pipe fittings.

Those skilled in the art will recognize that the positions of anvil 66 and knife blade 52 on punch jaw 24 and cradle jaw 22, respectively, are exemplary in nature and that the positions of same can be reversed if desired.

Although only certain embodiments have been illustrated and described, it will be apparent to those skilled in the art that various changes and modifications may be made therein without departing from the spirit of the invention or from the scope of the appended claims.

What is claimed is:

1. A tool for installing irrigation barb emitters in irrigation tubing, the tool comprising:

a cradle member having a cradle handle and a cradle jaw on opposing ends thereof, and a punch member having a punch handle and a punch jaw on opposing ends thereof, the cradle member and the punch member being arranged in crossed relation and connected intermediate the opposing ends at a pivot such that the cradle handle opposes the punch handle and the cradle jaw opposes the punch jaw;

a cradle mounted on the cradle jaw suitable for receiving a peripheral portion of an irrigation tubing;

a punch mounted at the distal end of the punch jaw having a hollow first cylinder and a low second cylinder telescopically received within the hollow first cylinder, the hollow first cylinder having a cap at the upper end thereof and an annular ring extending inwardly from to partially occlude the lower end thereof, the second hollow cylinder including a second cap at the upper end thereof adapted to slidably engage the interior of the first hollow cylinder, the second cap in combination with the annular ring preventing separation of the first hollow cylinder and the second hollow cylinder at the open end of the first hollow cylinder, the cap having a punch holder extending downwardly therefrom, a spring being wrapped concentrically around the punch holder which resiliently urges the second cap against the annular ring, a needle having a sharp tip extending downwardly from the punch holder through the second cap to a point beyond the first hollow cylinder, the needle being within the second hollow cylinder when the spring is fully extended, the needle extending beyond the second hollow cylinder when the spring is fully compressed; and one of said jaws having a knife blade extending from the other end thereof opposite to said handle, said knife blade having a longitudinal cutting edge, the other of said jaws defining a semi-circular concave anvil at the other end, said anvil having an axially extending slot therein for receiving the cutting edge of said knife blade when said handles are closed together with the said one handle nested within said channel-shaped handle, whereby a conduit supported in said semi-circular anvil can be cut readily by said knife blade upon squeezing said handles together while swinging said tool relative to said conduit and said conduit being completely severed as said knife blade edge is received in said slot.

\* \* \* \* \*